(12) United States Patent
Pflaum et al.

(10) Patent No.: US 11,935,572 B2
(45) Date of Patent: Mar. 19, 2024

(54) INCREASED STORAGE CAPACITY FOR A METHOD FOR LONG-TERM STORAGE OF INFORMATION AND STORAGE MEDIUM THEREFOR

(71) Applicant: Ceramic Data Solutions GmbH, Gmunden (AT)

(72) Inventors: Christian Pflaum, Bernried (DE); Martin Kunze, Gmunden (AT)

(73) Assignee: Ceramic Data Solutions GmbH, Gmunden (AT)

( * ) Notice: Subject to any disclaimer, the term of this patent is extended or adjusted under 35 U.S.C. 154(b) by 0 days.

(21) Appl. No.: 18/003,959

(22) PCT Filed: Jul. 3, 2020

(86) PCT No.: PCT/EP2020/068892
§ 371 (c)(1),
(2) Date: Dec. 30, 2022

(87) PCT Pub. No.: WO2022/002418
PCT Pub. Date: Jan. 6, 2022

(65) Prior Publication Data
US 2023/0260546 A1    Aug. 17, 2023

(51) Int. Cl.
*G11B 7/24*    (2013.01)
(52) U.S. Cl.
CPC .................... *G11B 7/24* (2013.01)
(58) Field of Classification Search
CPC ... G11B 7/24; G11B 7/00451; C04B 41/0036; C04B 41/009; C04B 41/5062; C04B 41/80; C04B 41/87; G09F 3/0291; G06K 7/10861; G06K 19/06046; G06K 19/06159; G06K 19/10; G06K 19/06037
See application file for complete search history.

(56) References Cited

U.S. PATENT DOCUMENTS

| | | | |
|---|---|---|---|
| 4,069,487 A | 1/1978 | Kasai et al. |
| 4,214,249 A | 7/1980 | Kasai et al. |
| 4,556,893 A | 12/1985 | Rinehart et al. |
| 4,797,316 A | 1/1989 | Hecq et al. |
| 5,063,556 A | 11/1991 | Chikuma |
| 5,761,111 A | 6/1998 | Glezer |
| 6,039,898 A | 3/2000 | Glushko |
| 6,120,907 A | 9/2000 | Tahon et al. |
| 6,133,986 A | 10/2000 | Johnson |

(Continued)

FOREIGN PATENT DOCUMENTS

| | | |
|---|---|---|
| CN | 110653494 A | 1/2020 |
| DE | 19724214 | 12/1998 |

(Continued)

OTHER PUBLICATIONS

Haight, Richard, et al., "High Resolution Material Ablation and Deposition with Femtosecond Lasers and Applications to Photomask Repair," Journal of Modern Optics, Nov. 10-Dec. 15, 2004, vol. 51, No. 16-18, pp. 2781-2796.

(Continued)

*Primary Examiner* — Andrew Sasinowski
(74) *Attorney, Agent, or Firm* — Lewis & Reese, PLLC

(57) ABSTRACT

The present invention relates to an information storage medium and a method for long-term storage of information.

20 Claims, 8 Drawing Sheets

(56) References Cited

U.S. PATENT DOCUMENTS

| | | | |
|---|---|---|---|
| 6,143,468 | A | 11/2000 | Ohno et al. |
| 6,171,730 | B1 | 1/2001 | Kuroda et al. |
| 6,214,250 | B1 | 4/2001 | Moh et al. |
| 6,340,543 | B1 | 1/2002 | Nagamura et al. |
| 6,543,691 | B1 | 4/2003 | Lemelson et al. |
| 8,462,605 | B2 * | 6/2013 | Ferren .................. G11B 7/24 369/273 |
| 10,181,336 | B1 | 1/2019 | Georgiou et al. |
| 10,315,276 | B2 | 6/2019 | Wagner et al. |
| 10,719,239 | B2 | 7/2020 | Rowstron et al. |
| 2002/0028015 | A1 | 3/2002 | Tack-Don et al. |
| 2002/0079297 | A1 | 6/2002 | Harrison |
| 2003/0186624 | A1 | 10/2003 | Koike et al. |
| 2003/0189228 | A1 | 10/2003 | Ieong et al. |
| 2005/0181089 | A1 | 8/2005 | Ogawa et al. |
| 2005/0208392 | A1 | 9/2005 | Yamamoto |
| 2006/0044385 | A1 | 3/2006 | Wurm et al. |
| 2006/0119743 | A1 | 6/2006 | Lin |
| 2006/0120262 | A1 | 6/2006 | Kiyono |
| 2006/0147841 | A1 | 7/2006 | Ohmi et al. |
| 2006/0196945 | A1 | 9/2006 | Mendels |
| 2008/0238611 | A1 | 10/2008 | Costa et al. |
| 2008/0320205 | A1 | 12/2008 | Lunt et al. |
| 2009/0207395 | A1 | 8/2009 | Kasono |
| 2009/0245077 | A1 | 10/2009 | Ueda et al. |
| 2010/0040960 | A1 | 2/2010 | Piao et al. |
| 2010/0135147 | A1 | 6/2010 | Bard et al. |
| 2010/0151391 | A1 | 6/2010 | Neogi et al. |
| 2010/0289186 | A1 | 11/2010 | Longo et al. |
| 2011/0318695 | A1 | 12/2011 | Hwang et al. |
| 2013/0273259 | A1 | 10/2013 | Depardieu et al. |
| 2015/0077535 | A1 | 3/2015 | Izatt et al. |
| 2015/0302926 | A1 | 10/2015 | Shiozawa et al. |
| 2015/0324677 | A1 | 11/2015 | Talyansky et al. |
| 2015/0382476 | A1 | 12/2015 | Zenou et al. |
| 2016/0118077 | A1 | 4/2016 | Lunt et al. |
| 2016/0199935 | A1 | 7/2016 | Chen et al. |
| 2018/0039806 | A1 | 2/2018 | Harrison |
| 2018/0130531 | A1 * | 5/2018 | Ahner .................. G11C 13/048 |
| 2019/0273025 | A1 | 9/2019 | Chen et al. |
| 2019/0324240 | A1 | 10/2019 | Shroff et al. |
| 2019/0353912 | A1 | 11/2019 | Chen et al. |
| 2020/0075383 | A1 * | 3/2020 | Minemura .............. C04B 37/02 |
| 2020/0142171 | A1 | 5/2020 | Xiong et al. |

FOREIGN PATENT DOCUMENTS

| | | |
|---|---|---|
| DE | 102014118497 | 6/2017 |
| EP | 2157533 | 2/2010 |
| EP | 3109058 | 12/2016 |
| EP | 3031785 | 10/2018 |
| EP | 3955248 | 2/2022 |
| EP | 4044182 | 8/2022 |
| JP | H02-215587 | 8/1990 |
| JP | H02-277689 | 11/1990 |
| JP | 2002-351055 A | 3/2002 |
| JP | 2003-137677 | 5/2003 |
| JP | 2004-062981 | 2/2004 |
| JP | 3913319 B2 | 5/2007 |
| JP | 6689067 | 4/2020 |
| KR | 20010112497 A1 | 12/2001 |
| WO | 91/13440 | 9/1991 |
| WO | 2000/073983 | 12/2000 |
| WO | 2021/028035 | 2/2021 |
| WO | 2022/002418 | 1/2022 |
| WO | 2022/002444 | 1/2022 |
| WO | 2022/033701 | 2/2022 |
| WO | 2022/033800 | 2/2022 |
| WO | 2022/194354 | 9/2022 |

OTHER PUBLICATIONS

Morishige, Yukio, "High Accuracy Laser Mask Repair Technology Using ps UV Solid State Laser," Second International Symposium on Laser Precision Microfabrication, Proceedings of SPIE, vol. 4426, 2002, pp. 416-423.

Venketakrishnan, K., et al., "Laser Writing Techniques for Photomask Fabrication Using a Femtosecond Laser," Applied Physics A Materials Science & Processing, vol. 74, 2002, pp. 493-496.

Examination Report regarding corresponding Australian Patent Application No. 2020456046, dated Sep. 27, 2023.

Gustafsson, Mats G.L., "Nonlinear Structured-Illumination Microscopy: Wide-Field Fluorescence Imaging with Theoretically Unlimited Resolution," PNAS, vol. 102, No. 37, Sep. 13, 2005, pp. 13081-13086.

Watanabe M., et al., "Three-Dimensional Optical Data Storage in Vitreous Silica," Japanese Journal of Applied Physics, JP, vol. 37, No. 12 B, part 02, Dec. 15, 1998.

Glezer, E. N., et al., "Three-Dimensional Optical Storage Inside Transparent Materials," Optics Letters, vol. 21, No. 24, Dec. 15, 1996, 3 pages.

Glezer E. N., et al., "Ultrafast-Laser Driven Micro-Explosions in Transparent Materials," Appl. Phys, Lett. 71 (7), Aug. 18, 1997, 3 pages.

Benton, David M., "Multiple Beam Steering Using Dynamic Zone Plates on a Micro-Mirror Array," Optical Engineeiing, 57 (7), 2018, 13 pages.

Qi, Z.B., et al., "A Comprehensive Study of the Oxidation Behavior of Cr2N and CrN Coatings," 544, 2013, pp. 515-520.

Webster's Ninth New Collegiate Dictionary; MerIian-Webster Inc.; Spiingfield, Mass, USA; 1990 (no month); excerpt p. 224.

"Glass Composition, Glass Types," retrieved Dec. 17, 2020 from website ://glassproperties.com/glasses.

International Search Report and Written Opinion regarding corresponding PCT Application No. PCT/EP2020/068892, dated Apr. 19, 2021.

* cited by examiner

INCREASED STORAGE CAPACITY FOR A METHOD FOR LONG-TERM STORAGE OF INFORMATION AND STORAGE MEDIUM THEREFOR

The invention relates to a method for long-term storage of information and to an information storage medium for long-term storage.

Currently there are a wide variety of information storage options available to choose from. With the arrival of the digital era the need for cheap and efficient information storage systems has been acute and numerous new technologies have emerged. The proliferation of information storage mechanisms, however, has come with certain unforeseen consequences. Today's information storage systems are highly fragile and susceptible to damage. Storage mediums such as hard drives and optical disks have life spans of merely a few years, and only when they are properly preserved and maintained. Even older technologies, such as paper and microfilm have lifespans of only centuries under the best circumstances. All of these information storage technologies are sensitive to heat, moisture, acid, etc. and can thus be easily degraded resulting in information loss.

As the need for data storage grows exponentially, the methods used for storing data have become increasingly vulnerable to destruction and susceptible to the passage of time. However, many types of information should be preserved against natural degradation to ensure continuation of information for generations to come. In the event of natural disasters, such as, for example, strong electro-magnetic radiation emitted by the sun, tremendous amounts of data could potentially be damaged or destroyed. Thus, there is a need for information storage that is resistant to environmental degradation and can thus store information over long periods of time.

SUMMARY

It is an object of the present invention to provide a method and medium for long term information storage.

This object is achieved with the features of the independent claims. Dependent claims refer to preferred embodiments.

According to a first aspect, the invention relates to a method for storage of information. The method comprises the steps of providing a ceramic substrate; and creating a plurality of recesses in a surface of the ceramic substrate by using a laser and/or a focused particle beam in order to encode information on the ceramic substrate. The plurality of recesses have different depths and each depth corresponds to a predefined bit of information.

According to a second aspect, the invention relates to a method for storage of information. The method comprises the steps of providing a ceramic substrate; coating the ceramic substrate with a layer of a second material different from the material of the ceramic substrate; optionally tempering the coated ceramic substrate to form a writable plate; and creating a plurality of recesses in a surface of the second material by using a laser and/or a focused particle beam in order to encode information in the second material. The plurality of recesses have different depths and each depth corresponds to a predefined bit of information.

The coated ceramic substrate may be optionally tempered before and/or after information encoding to improve the durability of the coated ceramic substrate including the encoded information. Such tempering is, in particular, preferable in case of ultra-long storage of information (e.g. more than 1,000 years) and/or in case of storage under particularly harsh conditions such as high humidity or in acidic environments. It is generally preferred to temper the coated substrate before information encoding as this allows providing the final coated substrate in the form of a writable plate to customers or end users who then only have to inscribe the information on the plate. However, depending on the material combinations and/or the inscription technique used it may also be preferable to first create the plurality of recesses and to only afterwards temper the coated ceramic substrate including the encoded information. Such final tempering will allow to more easily generate the recesses utilizing e.g. a less powerful laser source because the untempered second material will not be as durable as the tempered second material.

In another alternative, which is applicable to all aspect and embodiments discussed further below, tempering may not be performed as a separate method step before and/or after information encoding. Rather, certain coating techniques such as high-temperature PVD (physical vapor deposition), CVD (chemical vapor deposition), PECVD (plasma-enhanced chemical vapor deposition) or ALD (atomic layer deposition) may be performed under sufficiently high temperatures to achieve an in situ tempering during coating.

According to a third aspect, the invention relates to a method for storage of information. The method comprises the steps of providing a ceramic substrate; coating the ceramic substrate with two or more layers of different second materials being different from the material of the ceramic substrate; and creating a plurality of recesses in the layers of second materials by using a laser and/or a focused particle beam in order to encode information in the layers of second materials. The plurality of recesses have different depths and extend into different layers of the two or more layers and each depth corresponds to a predefined bit of information.

The coated ceramic substrate may be optionally tempered before and/or after information encoding to improve the durability of the coated ceramic substrate including the encoded information. Such tempering is, in particular, preferable in case of ultra-long storage of information (e.g. more than 1,000 years) and/or in case of storage under particularly harsh conditions such as high humidity or in acidic environments. It is generally preferred to temper the coated substrate before information encoding as this allows providing the final coated substrate in the form of a writable plate to customers or end users who then only have to inscribe the information on the plate. However, depending on the material combinations and/or the inscription technique used it may also be preferable to first create the plurality of recesses and to only afterwards temper the coated ceramic substrate including the encoded information. Such final tempering will allow to more easily generate the recesses utilizing e.g. a less powerful laser source because the untempered second material will not be as durable as the tempered second material.

In case of the presence of two or more layers it may also be preferable to temper the partially coated substrate, for example, after having coated the ceramic substrate with a first layer of a different material, and to subsequently apply one or more further layers of different materials.

In other words, the invention underlying the aspects 1 to 3 is based on the idea to utilize depth encoding in combination with extremely durable and stable substrates and/or layered structures. In various experiments, it turned out that it is possible to repeatably create recesses of different predetermined depths in these materials using a laser and/or a focused particle beam. Since it is also possible to measure these depths in a later decoding process one may easily encode various bits on a particular spot of the surface of the coated substrate, said spot having an area corresponding to the cross-sectional area (parallel to the substrate surface) of the recess. For example, a first depth d1 can encode the bit 00, a second depth equal to 2×d1 can encode the bit 01, a third depth equal to 3×d1 can encode the bit 10, and a fourth depth equal to 4×d1 can encode the bit 11. Of course, more than four depths may be used to encode even more bits on one and the same spot. For stable encoding and decoding, it is preferable that the smallest difference between subsequent predetermined depths (equal to d1 in this example) is much greater than, preferably by a factor of 5 and more preferably by a factor of 10, the standard deviation of the depth d1 achieved during creation of the recesses.

In cases where very small depths and depth differences are utilized it may be difficult to rely on the absolute position of, e.g., the bottom of each recess which may also depend on a thickness variation of the substrate and/or one of the other layers. It may thus be preferable to encode the bit information in a relative rather than an absolute depth. For example, each recess may comprise a step with two different depths (a reference depth and an encoding depth) or for each recess a twin recess with a reference depth may be provided. The bit can then be encoded in the difference between, for example, the encoding depth and the reference depth. This allows to produce the substrate and the optional additional layers with less accuracy and to reduce manufacturing costs. Of course, this principle may be extended to two or more encoding depths being measured with respect to one and the same reference depth. For example, a matrix of 3×3 or 5×5 recesses may all rely on one central reference depth.

The substrate may have any shape and size suitable for storing information. For example, the substrate may be rectangular, quadratic, round or may have a polygonal or other shape. The size may vary between 1 cm$^2$ and 1 m$^2$, preferably between 10 cm$^2$ and 1,000 cm$^2$, more preferably between 50 cm$^2$ and 250 cm$^2$.

The layer of the second material or the two or more layers of different second materials is/are preferably coated directly onto the ceramic substrate, i.e. without any intermediate layer being present, so as to achieve a strong bond between the ceramic substrate and the layer of the second material during tempering. However, tempering may generate a sintered interface between the ceramic substrate and the layer of the second material or the bottommost layer of the two or more layers of different second materials. The sintered interface may comprise at least one element from both the substrate material and the second material or the material of the bottommost layer of the two or more layers of different second materials because one or more elements from one of the two adjacent layers may diffuse into the other layer of the two adjacent layers. The presence of the sintered interface may further strengthen the bond between the ceramic substrate and the layer of the second material or the bottommost layer of the two or more layers of different second materials. Further sintered layers may be present between the various layers of different second materials with each sintered layer possibly containing at least one element from both adjacent layers.

The layer of second material or the two or more layers of different second materials is/are preferably continuous and preferably extend(s) over a large portion (e.g., at least 80% or at least 90%) of, more preferably the entire ceramic substrate. Preferably, the second material or the two or more layers of different second materials is/are different from the material of the ceramic substrate, i.e. the second material may have a different elemental composition than the material of the ceramic substrate or the second material and the ceramic substrate differ in terms of their microscopic structure, e.g. their state of crystallization or the like.

Tempering is a process which can be performed on certain materials, such as ceramics and metals, to improve their durability by altering the material's underlying physical or chemical properties. The tempering process may assist in fixing the second material or the material of the bottommost layer of the two or more layers of different second materials permanently to the ceramic substrate. In some cases, a portion of the second material layer or the bottommost layer of the two or more layers of different second materials may form a chemical bond to the underlying ceramic substrate, such as for example an inter-metallic or inter-ceramic bond. Tempering may improve the adhesion between substrate and second material or the material of the bottommost layer of the two or more layers of different second materials as well as the hardness of the layer of second material or the bottommost layer of the two or more layers of different second materials by at least 5%, preferably by at least 10%. Moreover, tempering may create a sintered interface as discussed above. Similar effects may be achieved between the two or more layers of different second materials: adhesion may be improved between adjacent layers and the hardness of each of these layers may be increased. Tempering may take place with or without oxygen.

If tempering is performed in an atmosphere containing oxygen, the surface or a topmost sub-layer of the layer(s) of the second material exposed to oxygen may, at least partly, be oxidized. Thus, a metal oxide layer may be formed on top of the layer(s) of the second material. This may further increase the hardness and/or the melting point and/or the resistance against corrosive environment.

Providing a writable plate with a ceramic substrate coated with a layer of second material as described herein allows for information storage thereon which is highly resistant to moisture, electric/magnetic fields, acidic, corrosive substance, etc. such that the encoded writable plate provides a durability which is unavailable from other commonly used information storage mediums.

Preferably, the two or more layers according to the third aspect each have a thickness smaller than 1 μm, preferably smaller than 100 nm, more preferably smaller than 10 nm.

Preferably, the two or more layers comprise a metal layer and a metal oxide layer adjacent to each other, wherein the metal element of the metal layer and the metal element of the metal oxide layer are preferably identical. It has turned out that it is particularly easy to measure depth differences between a metal layer surface and a metal oxide layer surface by means of interference because in case of exposure to broad band white light a selective reflection of the broad electromagnetic spectrum occurs or in case of exposure to a narrow band laser beam the reflection factor is increased (compare FIG. 6). Moreover, using an interface between a metal layer and a metal oxide layer is particularly advantageous because such a system does not tend to oxidize further which enhances stability of the layers. For this particular embodiment it is thus preferred that one of the different depths is a depth exposing a metal layer surface and another one of the different depths is a depth exposing a metal oxide layer surface in order to benefit from the optical difference between these surfaces during decoding.

Moreover, these material combinations allow also for color effects. Since different parts of the visible spectrum are typically reflected and/or absorbed by a metal and its corresponding oxide, the apparent color of the surface of the coated substrate depends on the depth of the respective recesses. Using different metal/metal oxide combinations it is thus possible to encode a number of different colors by means of different recess depths. Thus, a polychromatic ceramic microfilm may be manufactured. Decoding is also particularly simple in this case as one may simply illuminate the plate with white light and measure the color response. Of course, one may also combine the different approaches encoding some information by means of color and additional information by means of depth within one and the same material layer (corresponding to one and the same color response e.g. black, shades of grey and white).

Of course, the optical properties of the different materials of the various layers may also be utilized during decoding in case of other material combinations. It may, for example, be possible to utilize n layers of n different materials and to allocate each of the n different depths to a single one of these n layers for encoding $\log_2(n)$ bits of information. During decoding an optical material response may then be measured in order to determine the depth rather than performing an actual depth measurement.

Preferably, the plurality of recesses have at least two, preferably at least three, more preferably at least four, even more preferably at least five, even more preferably at least six, even more preferably at least seven, even more preferably at least eight, even more preferably at least sixteen and most preferably at least thirty-two different depths wherein each depth corresponds to a predefined bit of information.

Preferably, each recess is formed by one or more pulses of the laser and/or focused particle beam wherein the depth of each recess is controlled by one or a combination of the following parameters: energy of the pulses, duration of the pulses, number of pulses of the laser and/or focused particle beam.

Preferably, the minimum depth difference between the plurality of recesses is at least 1 nm, more preferably at least 10 nm, more preferably at least 30 nm, more preferably at least 50 nm, even more preferably at least 70 nm, and most preferably at least 100 nm. Preferably, the minimum depth difference between the plurality of recesses is at most 5 µm, more preferably at most 1 µm, more preferably at most 500 nm, more preferably at most 300 nm, even more preferably at most 200 nm, and most preferably at most 100 nm.

Preferably, the cross-sectional area of each recess is smaller than 100 µm², preferably smaller than 1 µm², more preferably smaller than 100 nm², even more preferably smaller than 10 nm².

According to a fourth aspect, the invention relates to a method for storage of information. The method comprises the steps of providing a ceramic substrate; coating the ceramic substrate with a layer of a second material different from the material of the ceramic substrate; and creating a plurality of nanostructures in a surface of the second material by using a laser and/or a focused particle beam in order to encode information in the second material. The plurality of nanostructures have different optical properties wherein each optical property corresponds to a predefined bit of information.

Again, the coated ceramic substrate may be optionally tempered before and/or after information encoding to improve the durability of the coated ceramic substrate including the encoded information.

In other words, the invention underlying this fourth aspect is based on the idea to utilize surface modification encoding in combination with extremely durable and stable substrates and/or layered structures. In various experiments, it turned out that it is possible to repeatably create nanostructures such as nanoripples having different optical properties using a laser and/or a focused particle beam. Since it is also possible to measure these optical properties in a later decoding process one may easily encode various bits on a particular spot of the surface of the coated substrate. For example, a first orientation of the nanoripples can encode the bit 00, a second orientation of the nanoripples can encode the bit 01, a third orientation of the nanoripples can encode the bit 10, and a fourth orientation of the nanoripples can encode the bit 11. Of course, more than four orientations of the nanoripples may be used to encode even more bits on one and the same spot.

Preferably, the different optical properties of the plurality of nanostructures comprise one or more of the following: orientation or polarization of nano-ripples, frequency or wavelength of nano-ripples, amplitude of nano-ripples. Preferably, the plurality of nano-ripples have at least two, preferably at least three, more preferably at least four, even more preferably at least five, even more preferably at least six, even more preferably at least seven, even more preferably at least eight, even more preferably at least 16 and most preferably at least 32 different orientations, polarizations, frequencies, wavelengths or amplitudes and wherein each orientation, polarization, frequency, wavelength or amplitude corresponds to a predefined bit of information.

Each of the following preferred features are, unless specified otherwise, applicable to each of the four aspects outlined above.

Preferably, the ceramic substrate of the method for information storage comprises an oxidic ceramic, more preferably the ceramic substrate comprises at least 90%, most preferably at least 95%, by weight of one or a combination of $Al_2O_3$, $TiO_2$, $SiO_2$, $ZrO_2$, $ThO_2$, MgO, $Cr_2O_3$, $Zr_2O_3$, $V_2O_3$ or any other oxidic ceramic material. These materials are known to be particularly durable under various circumstances and/or to resist environmental degradation. Thus, these materials are particularly suitable for long-term storage under different conditions. It is particularly preferred that the ceramic substrate comprises one or a combination of $Al_2O_3$, $ZrO_2$, $ThO_2$, $SiO_2$ and/or MgO. According to the present invention, the term "ceramic material" preferably encompasses glass ceramics having an amorphous phase and one or more crystalline phases. Moreover, the above-mentioned ceramic materials may also be present in the form of a polycrystalline or monocrystalline material. For example, monocrystalline aluminum oxide (i.e. sapphire) is particularly suitable as a substrate material in terms of durability as it has a very high melting point and a very high Mohs hardness.

Preferably, the ceramic substrate comprises a non-oxidic ceramic, more preferably the ceramic substrate comprises at least 90%, most preferably at least 95%, by weight of one or a combination of a metal nitride such as CrN, CrAlN, TiN, TiCN, TiAlN, ZrN, AlN, VN, $Si_3N_4$, ThN, HfN, BN; metal carbide such as TiC, CrC, $Al_4C_3$, VC, ZrC, HfC, ThC, $B_4C$, SiC; a metal boride such as $TiB_2$, $ZrB_2$, $CrB_2$, $VB_2$, $SiB_6$, $ThB_2$, $HfB_2$, $WB_2$, $WB_4$ and a metal silicide such as $TiSi_2$, $ZrSi_2$, $MoSi_2$, MoSi, $WSi_2$, PtSi, $Mg_2Si$ or any other non-oxidic ceramic material. These materials are known to be particularly durable under various circumstances and/or to resist environmental degradation. Thus, these materials are particularly suitable for long-term storage under different conditions. It is particularly preferred that the ceramic substrate comprises one or a combination of BN, $CrSi_2$, SiC, and/or $SiB_6$.

Preferably, the ceramic substrate comprises one or a combination of Ni, Cr, Co, Fe, W, Mo or other metals with a melting point above 1,400° C. Preferably, the ceramic material and the metal form a metal matrix composite with the ceramic material being dispersed in the metal or metal alloy. Preferably, the metal amounts to 5-30% by weight, preferably 10-20% by weight of the ceramic substrate, i.e. the metal matrix composite. Particularly preferred metal matrix composites are: WC/Co—Ni—Mo, BN/Co—Ni—Mo, TiN/Co—Ni—Mo and/or SiC/Co—Ni—Mo.

Preferably, the second material comprises at least one of a metal such as Cr, Co, Ni, Fe, Al, Ti, Si, W, Zr, Ta, Th, Nb, Mn, Mg, Hf, Mo, V; or a ceramic material such as a metal nitride such as CrN, CrAlN, TiN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal oxide such as $Al_2O_3$, $TiO_2$, $SiO_2$, $ZrO_2$, $ThO_2$, MgO, $Cr_2O_3$, $Zr_2O_3$, $V_2O_3$; a metal boride such as $TiB_2$, $ZrB_2$, $CrB_2$, $VB_2$, $SiB_6$, $ThB_2$, $HfB_2$, $WB_2$, $WB_4$; a metal silicide such as $TiSi_2$, $ZrSi_2$, $MoSi_2$, MoSi, $WSi_2$, PtSi, $Mg_2Si$; or any other ceramic material; preferably wherein the second material comprises CrN, $Cr_2O_3$ and/or CrAlN. These materials provide sufficient hardness and resistance to environmental degradation. Furthermore, said materials can provide sufficient visual contrast with the underlying ceramic substrate. Moreover, experiments have shown these materials to be strongly bonded to the substrates mentioned above once being coated e.g. with PVD (physical vapor deposition), sputtering, CVD (chemical vapor deposition), PECVD (plasma-enhanced chemical vapor deposition) or ALD (atomic layer deposition). An additional tempering with or without presence of oxygen can further improve the strength of these bonds. Thus, a durable, permanent connection between the coated layer(s) and the substrate may be achieved. It is particularly preferred that the second material comprises one or a combination of Co, Ni, $B_4C$, HfC, $Cr_2O_3$, $ZrB_2$, $CrB_2$, $SiB_6$, $Si_3N_4$, ThN, CrN, $Cr_2O_3$ and/or CrAlN.

In the context of the present invention, various material properties may play an important role. For one, the materials of both the substrate and the coating layer need to be sufficiently durable, stable and resistant. Moreover, a strong bond or connection between the coating layer and the substrate material is required. Taking all these constraints into account, the following material combinations are particularly preferred: $Al_2O_3$/CrN, $SiO_2$/Cr, $SiO_2$/CrN, $Al_2O_3$/Co, $ZrO_2$/$ZrB_2$, $Al_2O_3$/SiC, $SiB_6$/$Cr_2O_3$, SiC/HfC, BN/$ZrB_2$, BN/$ZrB_2$, BN/$B_4C$, BN/ThN and $CrSi_2$/$Si_3N_4$.

Generally, any technique suitable to achieve thin coatings may be utilized for coating the ceramic substrate with the layer of the second material or the two or more layers of different second materials, e.g. physical vapor deposition, sputtering, chemical vapor deposition, or any other thin film coating method. Preferably physical vapor deposition is used to coat the ceramic substrate with the layer of second material or the two or more layers of different second materials. This particularly allows for reliably providing very thin coating layers which continuously cover the substrate without any defects which could be misinterpreted as encoded information. Since it may be difficult to use PVD for some of the materials mentioned above it is preferred that, during physical vapor deposition, the ceramic substrate is positioned intermediate a source of the second material or the material of the two or more layers of different second materials and an electrically conductive plate and/or wire grating. A plate or grating positioned behind the ceramic substrate helps to direct the vapor of second material to adhere to the (non-conducting) ceramic substrate.

Preferably the layer of second material or the two or more layers of different second materials has/have a thickness no greater than 10 µm, more preferably no greater than 5 µm, even more preferably no greater than 1 µm, even more preferably no greater than 100 nm, even more preferably no greater than 10 nm.

By providing (a) thin layer(s) of the second material(s), the laser or particle beam removal of localized areas of the second material may be performed more quickly and effectively. Moreover, much smaller localized areas may be altered more precisely if the layer(s) of second material(s) is/are thinner. Thus, the information content per area may be improved.

Preferably tempering the coated ceramic substrate involves heating the coated ceramic substrate to a temperature within a range of 200° C. to 4,000° C., more preferably within a range of 1,000° C. to 2,000° C. The tempering process may comprise a heating phase with a temperature increase of at least 10 K per hour, a plateau phase at a peak temperature for at least 1 minute and finally a cooling phase with a temperature decrease of at least 10 K per hour. The tempering process may assist in hardening the ceramic substrate and/or permanently bonding the second material to the ceramic substrate.

Preferably the localized areas of the coated substrate are heated for the writing/encoding process to at least a melting temperature and/or a decomposition temperature of the second material such that the localized areas of second material are heated to a temperature of at least 3,000° C., even more preferably at least 3,200° C., most preferably at least 3,500° C., most preferably at least 4,000° C. For example, CrN decomposes at a temperature of about 1,500° C. into Cr (solid) and N (gaseous), whereas the melting temperature of Cr is only reached at about 1,900° C. Yet, the Cr (silver colored) is noticeably different from the CrN (grayish). Alternatively, treating the surface of the coated substrate with, e.g., a femtosecond-laser may lead to cold so-called Coulomb explosions leading to material ablation.

Preferably the laser is configured to produce laser light having a wavelength within a range of 10 nm to 30 µm, preferably within a range of 100 nm to 2,000 nm, more preferably within a range of 200 nm to 1,500 nm.

Preferably the laser light emitted by the laser has a minimum focal diameter no greater than 50 µm, more preferably no greater than 15 µm, more preferably no greater than 10 µm, more preferably no greater than 5 µm, more preferably no greater than 1 µm, more preferably no greater than 500 nm, more preferably no greater than 100 nm, more preferably no greater than 50 nm, more preferably no greater than 10 nm. A small focal diameter allows for information to be encoded on the writable plate with a higher density.

Preferably, an ultra-short pulse laser (picosecond, femtosecond or attosecond pulse) is used for encoding information. This allows for achieving minimal focal diameters no greater than 10 µm and structures no greater than 5 µm width, more preferably no greater than 1 µm, more preferably no greater than 500 nm, more preferably no greater than 100 nm, more preferably no greater than 50 nm, more preferably no greater than 10 nm.

The laser beam is preferably directed at predetermined spots on the surface of the coated substrate for encoding bits at these predetermined spots by means of a suitable scanning technique, e.g. galvanometric scanners, polygon scanners, digital micro mirror devices, spatial light modulators etc. Moreover, suitable optics may be involved. For example, the laser beam may be directed through a microscope objective for precise positioning. Oil, water and other fluids with a high refractive index may be used for the immersion of the optics in this context.

Preferably a particle beam emitted by the focused particle beam equipment has a minimum focal diameter no greater than 5 µm, more preferably no greater than 1 µm, more preferably no greater than 100 nm, more preferably no greater than 10 nm. An extremely small focal diameter allows for information to be encoded on the writable plate with an ultra-higher density.

Preferably the method further comprises the step of reading information encoded on the writable plate, more preferably using a digital scanner, digital microscope, laser scanning microscope, optical coherence tomography or scanning electron microscope.

Preferably areas of the coated substrate comprise at least 1 Megabyte of information per $cm^2$, more preferably at least 10 Megabytes of information per $cm^2$, even more preferably at least 100 Megabytes of information per $cm^2$, even more preferably at least 1 Gigabyte of information per $cm^2$, even more preferably at least 10 Gigabytes of information per $cm^2$. A greater information storage density allows for the storage of large quantities of information.

According to a fifth aspect, the invention relates to an information storage medium. The information storage medium comprises a ceramic substrate, wherein the surface of the ceramic substrate comprises a plurality of recesses encoding information on the information storage medium, wherein the plurality of recesses have different depths and wherein each depth corresponds to a predefined bit of information.

According to a sixth aspect, the invention relates to an information storage medium. The information storage medium comprises a ceramic substrate coated with a layer of a second material and a sintered interface between the ceramic substrate and the layer of the second material, wherein the second material is different from the material of the ceramic substrate, wherein the sintered interface comprises at least one element from both the substrate material and the second material, wherein the layer of the second material comprises a plurality of recesses encoding information on the information storage medium, wherein the plurality of recesses have different depths and wherein each depth corresponds to a predefined bit of information.

According to a seventh aspect, the invention relates to an information storage medium. The information storage medium comprises a ceramic substrate coated with two or more layers of different second materials and a sintered interface at least between the ceramic substrate and the bottommost layer of the two or more layers, wherein the second materials are different from the material of the ceramic substrate, wherein the sintered interface comprises at least one element from both the substrate material and the material of the bottommost layer, wherein the information storage medium comprises a plurality of recesses encoding information on the information storage medium, wherein the plurality of recesses have different depths and wherein each depth corresponds to a predefined bit of information.

Preferably the two or more layers each have a thickness smaller than 1 µm, preferably smaller than 100 nm, more preferably smaller than 10 nm.

Preferably the two or more layers comprise a metal layer and a metal oxide layer, wherein the metal element of the metal layer and the metal element of the metal oxide layer are preferably identical.

Preferably the plurality of recesses have at least two, preferably at least three, more preferably at least four, more preferably at least five, even more preferably at least six, more preferably at least seven, even more preferably at least eight, even more preferably at least 16, and most preferably at least 32 different depths and wherein each depth corresponds to a predefined bit of information.

Preferably the minimum depth difference between the plurality of recesses is at least 1 nm, more preferably at least 10 nm, more preferably at least 30 nm, more preferably at least 50 nm, even more preferably at least 70 nm, and most preferably at least 100 nm. Preferably the minimum depth difference between the plurality of recesses is at most 5 µm, more preferably at most 1 µm, more preferably at most 500 nm, more preferably at most 300 nm, even more preferably at most 200 nm, and most preferably at most 100 nm.

According to an eighth aspect, the invention relates to an information storage medium. The information storage medium comprises a ceramic substrate coated with a layer of a second material and a sintered interface between the ceramic substrate and the layer of the second material, wherein the second material is different from the material of the ceramic substrate, wherein the sintered interface comprises at least one element from both the substrate material and the second material, wherein the surface of the layer of the second material comprises a plurality of nanostructures, wherein the plurality of nanostructures have different optical properties and wherein each optical property corresponds to a predefined bit of information.

Preferably the different optical properties of the plurality of nanostructures comprise one or more of the following: orientation or polarization of nano-ripples, frequency or wavelength of nano-ripples, amplitude of nano-ripples. Preferably the plurality of nano-ripples have at least two, preferably at least three, more preferably at least four, more preferably at least five, more preferably at least six, more preferably at least seven, even more preferably at least eight, more preferably at least sixteen and most preferably at least 32 different orientations, polarizations, frequencies, wavelengths or amplitudes and wherein each orientation, polarization, frequency, wavelength or amplitude corresponds to a predefined bit of information.

Each of the following preferred features are, unless specified otherwise, applicable to each of the fifth to eighth aspects outlined above.

Preferably the ceramic substrate of the information storage medium comprises an oxidic ceramic, more preferably wherein the ceramic substrate comprises at least 90%, even more preferably at least 95%, by weight of one or a combination of $Al_2O_3$, $TiO_2$, $SiO_2$, $ZrO_2$, $ThO_2$, MgO, $Cr_2O_3$, $Zr_2O_3$, $V_2O_3$ or any other oxidic ceramic material.

Preferably, the ceramic substrate of the information storage medium comprises a non-oxidic ceramic, more preferably wherein the ceramic substrate comprises at least 90%, even more preferably at least 95%, by weight of one or a combination of a metal nitride such as CrN, CrAlN, TiN, TiCN, TiAlN, ZrN, AlN, VN, $Si_3N_4$, ThN, HfN, BN; metal carbide such as TiC, CrC, $Al_4C_3$, VC, ZrC, HfC, ThC, $B_4C$, SiC; a metal boride such as $TiB_2$, $ZrB_2$, $CrB_2$, $VB_2$, $SiB_6$, $ThB_2$, $HfB_2$, $WB_2$, $WB_4$ and a metal silicide such as $TiSi_2$, $ZrSi_2$, $MoSi_2$, MoSi, $WSi_2$, PtSi, $Mg_2Si$, or any other non-oxidic ceramic material.

It is particularly preferred that the ceramic substrate comprises one or a combination of BN, $CrSi_2$, SiC, and/or $SiB_6$.

Preferably, the ceramic substrate comprises one or a combination of Ni, Cr, Co, Fe, W, Mo or other metals with a melting point above 1,400° C. Preferably, the ceramic material and the metal form a metal matrix composite with the ceramic material being dispersed in the metal or metal alloy. Preferably, the metal amounts to 5-30% by weight, preferably 10-20% by weight of the ceramic substrate, i.e. the metal matrix composite. Particularly preferred metal matrix composites are: WC/Co—Ni—Mo, BN/Co—Ni—Mo, TiN/Co—Ni—Mo and/or SiC/Co—Ni—Mo.

Preferably the second material of the information storage medium comprises at least one of a metal such as Cr, Co, Ni, Fe, Al, Ti, Si, W, Zr, Ta, Th, Nb, Mn, Mg, Hf, Mo, V, a metal nitride such as CrN, CrAlN, TiN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal oxide such as $Al_2O_3$, $TiO_2$, $SiO_2$, $ZrO_2$, $ThO_2$, MgO, $Cr_2O_3$, $Zr_2O_3$, $V_2O_3$; a metal boride such as $TiB_2$, $ZrB_2$, $CrB_2$, $VB_2$, $SiB_6$, $ThB_2$, $HfB_2$, $WB_2$, $WB_4$; a metal silicide such as $TiSi_2$, $ZrSi_2$, $MoSi_2$, MoSi, $WSi_2$, PtSi, $Mg_2Si$ or any other ceramic material; preferably wherein the second material comprises CrN, $Cr_2O_3$ and/or CrAlN.

Preferably the layer of second material has a thickness no greater than 10 µm, more preferably no greater than 5 µm, even more preferably no greater than 1 µm, even more preferably no greater than 100 nm, even more preferably no greater than 10 nm.

Preferably areas of the coated substrate comprise at least 1 kilobyte of information per $cm^2$, more preferably at least 10 kilobytes of information per $cm^2$, even more preferably at least 100 kilobytes of information per $cm^2$, even more preferably at least 1 Megabytes of information per $cm^2$, even more preferably at least 10 Megabytes of information per $cm^2$, even more preferably at least 100 Megabytes of information per $cm^2$, even more preferably at least 1 Gigabytes of information per $cm^2$, even more preferably at least 10 Gigabytes of information per $cm^2$. Providing a high information density on the coated substrate allows more information to be stored per plate and can reduce the costs of production.

Preferably the ceramic substrate has the shape of a tablet or a computer readable disk. A tablet or computer readable disk shape may allow computers or digital scanners to easily read the encoded information and to be compatible to existing scanning systems.

The invention further relates to a use of the information storage medium for long-term information storage.

Preferably, in use the information storage medium is stored for a period of at least 10 years, more preferably at least 100 years, more preferably at least 1,000 years, more preferably at least 10,000 years, even more preferably at least 100,000 years.

The invention further relates to a method for decoding information encoded on the information storage medium described above. The method comprises the steps of providing the information storage medium described above; measuring the depth of at least a subset of the plurality of recesses or the optical property of at least a subset of the plurality of nanostructures; and decoding the bits of information corresponding to the measured depths or the measured optical properties.

Preferably, measuring the depth or the optical property is performed using a laser beam and/or a focused particle beam such as an electron beam.

Preferably, measuring the depth is based on one or a combination of: interference, reflection, absorption, ellipsometry, frequency comb technique, fluorescence microscopy such as STED or STORM, optical coherence tomography, scanning electron microscopy, digital (immersion) microscopy (using reflected or transmitted light).

Preferably, measuring the optical property is based on one or a combination of: absorption, transmission, reflection, polarization, interference of non-coherent light and/or laser light.

While the above-described methods mostly rely on direct ablation of material using a laser or particle beam, it should be noted that alternative methods for creating recesses of different depths in a coating are known and may be utilized instead of the direct ablation techniques discussed above. For example, the coated substrate may be coated with an additional layer of photoresist which may be exposed to light or other radiation in order to generate a certain pattern. After developing the exposed photoresist the coated substrate together with the photoresist may be etched in order to ablate material of, e.g., the layer of the second material from the substrate wherever no developed photoresist is present. Thus, a pattern of recesses will be created. In order to create recesses having different depths, said process has to be repeated several times with the number of etchings taking place at a specific location corresponding to the depth of the recess at said location. Suitable techniques for such etching processes are known in the art and described, e.g., in Handbook of Semiconductor Manufacturing Technology, Second Edition, edited by Robert Doering and Yoshio Nishi, CRC Press. For example, chrome may be wet etched with cerric ammonium nitrate and certain acids that include perchloric, acetic, nitric and hydrochloric acids.

BRIEF DESCRIPTION OF THE DRAWINGS

The subject matter of the invention will be explained in more detail in the following text with reference to preferred exemplary embodiments which are illustrated in the attached drawings, in which:

FIG. 8d shows the cross sectional height profile through the micrograph of FIG. 8a;

In principle, identical parts are provided with the same reference signs in the figures.

DETAILED DESCRIPTION

Figure 1:
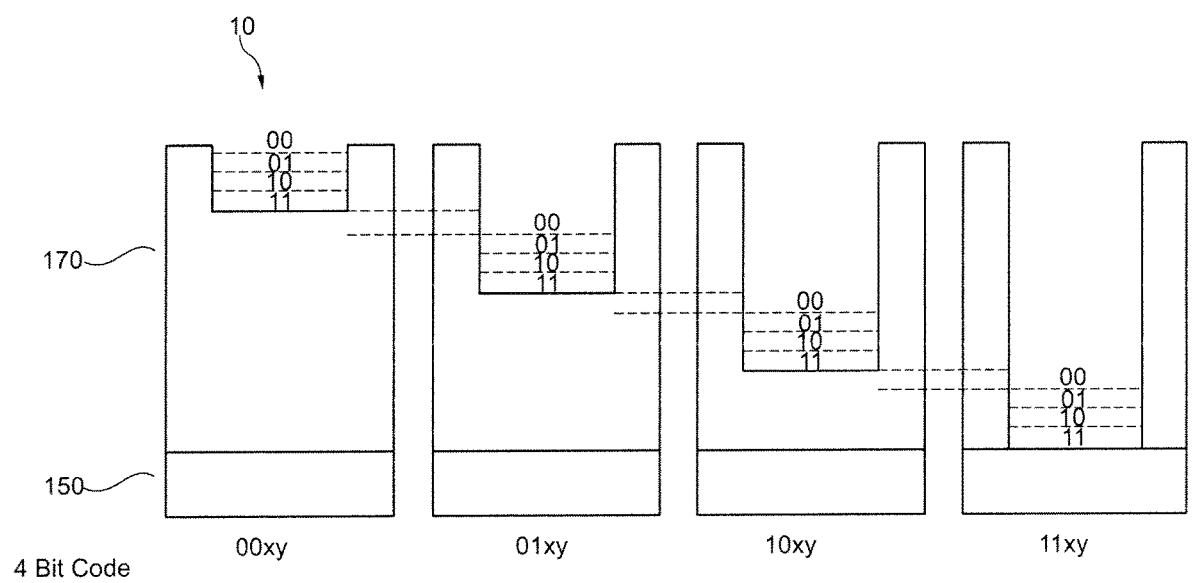
FIG. 1 schematically depicts a cross section through an information storage medium according to a preferred embodiment of the present invention.

FIG. 1 schematically depicts a cross section through an information storage medium suitable for long-term storage of information according to a preferred embodiment of the present invention. The information storage medium comprises a ceramic substrate 150 coated with a layer of a second material 170, the second material 170 being different from the material of the ceramic substrate 150. As mentioned above, a sintered interface (not shown) may be present between the ceramic substrate 150 and the layer of the second material 170 due to the optional tempering process. The layer of the second material 170 comprises a plurality of recesses 10 (four of which are shown exemplary) having different depths, wherein each depth corresponds to a predefined bit of information. In the embodiment shown in FIG. 1, four bits of information can be encoded. For example, the smallest depth of a recess 10 (or, alternatively, a surface without any recess at all) may correspond to the code "0000". The largest depth of a recess 10 extending, for example, all the way through the second layer 170 to the substrate 150 may correspond to the code "1111". Analogously, each of the intermediate depths corresponds to a specific predefined bit of information as well. While the depth difference between subsequent codes is shown in FIG. 1 to be constant, this does not necessarily to be the case.

Of course, the 4-bit code shown in FIG. 1 is only one specific example. Depending on the thickness of the second layer 170 and the depth differences of the various recesses 10 which can be both reliably manufactured for encoding and reliably measured for decoding more or less bits may be encoded.

Figure 2:
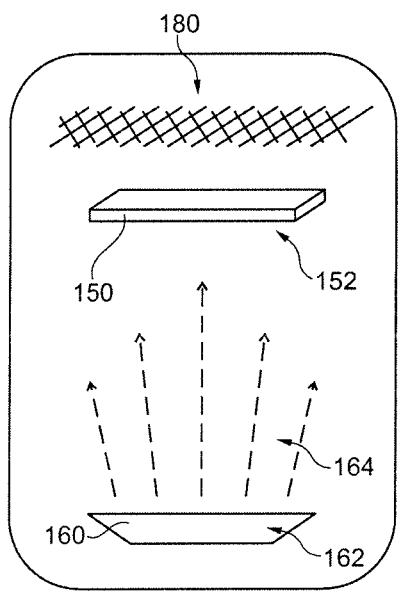
FIG. 2 schematically depicts an example of the process of physical vapor deposition coating of the ceramic substrate.

In order to produce such an information storage medium, a method for storage of information is described herein. Initially, a ceramic substrate 150 is provided. As schematically shown in FIG. 2, the ceramic substrate 150 is then coated with a layer of a second material 170. The layer of second material 170 is preferably no greater than 50 µm thick. The writable plate 110 comprising the ceramic substrate 150 and the layer of second material 170 may either be stored until ready for use or may subsequently be encoded with information 120 using, e.g., a laser or focused particle beam 190. The laser or focused particle beam 190 is directed toward the layer of second material 170 and then, e.g., heats localized areas of the second material 170 which fall within the focus of the laser or focused particle beam such that recesses are being formed at these localized areas. This method will now be described in more detail.

The ceramic substrate 150 which is initially provided may comprise the majority of the material by weight of the writable plate 110. A number of different materials may be used for the ceramic substrate 150. In certain configurations the ceramic substrate 150 comprises an oxidic ceramic comprising at least one of $Al_2O_3$, $TiO_2$, $SiO_2$, $ZrO_2$, $ThO_2$, MgO, $Cr_2O_3$, $Zr_2O_3$, $V_2O_3$ or any other oxidic ceramic material. Alternatively, the ceramic substrate may comprise a non-oxidic ceramic comprising at least one of a metal nitride such as CrN, CrAlN, TiN, TiCN, TiAlN, ZrN, AlN, VN, $Si_3N_4$, ThN, HfN, BN; metal carbide such as TiC, CrC, $Al_4C_3$, VC, ZrC, HfC, ThC, $B_4C$, SiC; a metal boride such as $TiB_2$, $ZrB_2$, $CrB_2$, $VB_2$, $SiB_6$, $ThB_2$, $HfB_2$, $WB_2$, $WB_4$ and a metal silicide such as $TiSi_2$, $ZrSi_2$, $MoSi_2$, MoSi, $WSi_2$, PtSi, $Mg_2Si$, or any other non-oxidic ceramic material. The amount of the oxidic or non-oxidic ceramic present may vary. Preferably the amount of oxidic or non-oxidic ceramic makes up at least 90% by weight of the ceramic substrate 150. More preferably the amount of the oxidic or non-oxidic ceramic substrate makes up at least 95% by weight of the ceramic substrate 150. One preferred configuration is a ceramic substrate 150 comprising at least 90% $Al_2O_3$ or $SiO_2$ measured by weight.

The second material 170 is formed as a layer on the ceramic substrate 150. The layer of second material 170 is a thin layer in comparison with the thickness of the ceramic substrate 150 (FIG. 1 not to scale), the second layer 170 being preferably at most 50 µm thick. The second material 170 may principally comprise at least one of a metal such as Cr, Co, Ni, Fe, Al, Ti, Si, W, Zr, Ta, Th, Nb, Mn, Mg, Hf, Mo, V, a metal nitride such as CrN, CrAlN, TiN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal oxide such as $Al_2O_3$, $TiO_2$, $SiO_2$, $ZrO_2$, $ThO_2$, MgO, $Cr_2O_3$, $Zr_2O_3$, $V_2O_3$; a metal boride such as $TiB_2$, $ZrB_2$, $CrB_2$, $VB_2$, $SiB_6$, $ThB_2$, $HfB_2$, $WB_2$, $WB_4$; a metal silicide such as $TiSi_2$, $ZrSi_2$, $MoSi_2$, MoSi, $WSi_2$, PtSi, $Mg_2Si$ or any other ceramic material; preferably wherein the second material comprises CrN, $Cr_2O_3$ and/or CrAlN.

One preferred configuration is a layer of second material 170 comprising principally CrN, $Cr_2O_3$ and/or CrAlN.

FIG. 2 illustrates an exemplary method for coating the second material 170 onto the ceramic substrate 150 using physical vapor deposition (PVD). In the PVD process the ceramic substrate 150 is placed into a physical vapor deposition chamber together with a source 160 of second material 162. A vacuum is drawn on the physical vapor deposition chamber and the source 160 of second material is heated until a significant portion of the second material 162 contained therein is evaporated or sublimated. The airborne particles 164 of second material then disperse throughout the physical vapor deposition chamber until they contact a surface 152 of the ceramic substrate 150 and adhere thereto.

Although physical vapor deposition is a method commonly used for coating metal substrates, coating ceramic substrates can prove challenging for particles to adhere to. Thus, in order to improve adherence of second material particles 164 to the ceramic substrate surface 152, a conductive wire mesh or conductive metal plate 180 may be placed on the far side of the ceramic substrate 150, such that the ceramic substrate 150 is positioned in between the wire mesh 180 and the source 160 of second material 162. Such a conductive mesh/plate 180 when conducting current may attract ionized particles of second material 164 which then encounter the surface 152 of the ceramic substrate 150 and are held there against such that they then adhere to the surface 152 of the ceramic substrate. This coating process may also be repeated in order to coat multiple different surfaces of the ceramic substrate as discussed further below.

Depositing a layer of second material 170 on the ceramic substrate 150 may be performed using other coating methods, such as sputtering or sublimation sandwich coating. Essentially, any method capable of producing a layer of second material 170 may be used. The second material 170 may not necessarily cover the entire ceramic substrate 150. Instead only portions of the ceramic substrate 150 or a singular side 152 of the ceramic substrate 150 may be coated with the second material 170.

Once the ceramic substrate 150 is coated with a second material 170, the coated ceramic substrate then preferably undergoes an optional tempering process. Tempering is generally understood to be a process which improves the strength and/or other qualities of a material. In the case of ceramics, tempering can involve heating a ceramic item such that the chemical components thereof undergo chemical and/or physical changes such that the item becomes fixed or hardened. Tempering of the coated ceramic substrate may involve heating the coated ceramic substrate 150 to a temperature within a range of 200° C. to 4,000° C., preferably within a range of 1,000° C. to 2,000° C. The tempering process may comprise a heating phase with a temperature increase of at least 10 K per hour, a plateau phase at a peak temperature for at least 1 minute and finally a cooling phase with a temperature decrease of at least 10 K per hour. The tempering process may assist in fixing the second material 170 permanently to the ceramic substrate 150. In some cases, a portion of the second material layer 170 may form a chemical bond to the underlying ceramic substrate 150. After tempering the ceramic substrate 150 with the second material 170, the writable plate 110 is formed. The properties of the writable plate 110 are determined by the exact materials used within the writable plate 110. The writable plate 110 may now be stored or directly encoded with information 120. As mentioned above, the coated substrate may, in addition or alternatively, be tempered before and/or after information encoding.

Figure 3:
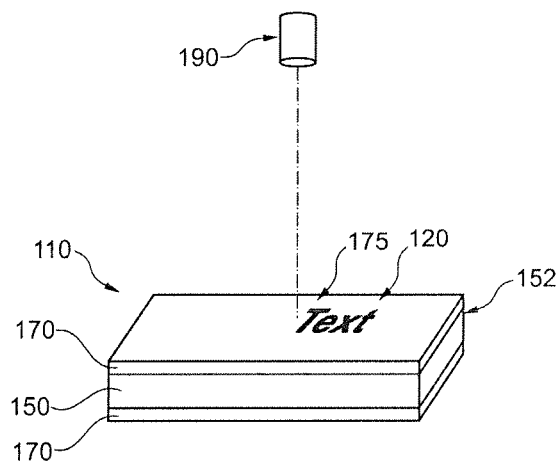
FIG. 3 schematically shows a perspective view of an example of encoding a writable plate with information using a laser.

FIG. 3 depicts the encoding of information onto the writable plate 110. During encoding, a laser or focused particle beam 190 directs collimated laser light or focused particle beam onto a layer of second material 170 of the writable plate 110. The laser or focused particle beam alters the portion of second material 170 within the localized area 175 such that it is (e.g. optically) distinguishable from the surrounding second material 170. While FIG. 3 schematically shows the laser or focused particle beam imprint of a text, it is to be noted that the encoding of multiple bits according to the present invention is most suitable for digital encoding of information. Alternatively, however, the different depths may also be used to achieve a color effect which may be used for providing a colored text or a colored image on the writable plate 110.

Preferably the laser or focused particle beam heats the localized area 175 of the second material 170 to at least the melting temperature and/or decomposition temperature of the second material 170. The melting point of the second material 170 is dependent on the chemical composition thereof. Preferably, heating the localized areas 175 past the melting point may involve heating the localized areas to a temperature of at least 3,000° C., more preferably at least 3,200° C., and even more preferably at least 3,500° C., most preferably at least 4,000° C. Imparting these localized areas with such high temperatures may cause a rapid expansion of the second material 170 within the localized areas 175. This rapid expansion can cause the second material 170 within the localized areas 175 to be ablated and/or vaporized.

Suitable laser wavelengths for the laser encoding methods may include a wavelength within a range of 10 nm to 30 µm, preferably within a range of 100 nm to 2,000 nm, more preferably within a range of 150 nm to 1,500 nm. Of further importance is the minimum focal diameter of the laser light or focused particle beam which dictates the minimum size of each recess. Preferably the laser or focused particle source 190 is capable of focusing the laser light or focused particle beam to have a minimum focal diameter no greater than 50 µm, preferably no greater than 15 µm, preferably no greater than 5 µm, preferably no greater than 1 µm, preferably no greater than 100 nm, more preferably no greater than 10 nm.

The form of the writable plate 110 can be determined by the needs of the user and the types of information 120 to be encoded. In some instances, the writable plate 110 can be formed in a tablet shape for storage, preferably no larger than 200 mm by 200 mm, more preferably no larger than 100 mm by 100 mm, more preferably no larger than 10 mm by 10 mm. In other instances a computer readable disk-shape may be preferable with a diameter no larger than 30 cm, more preferably no larger than 12 cm, more preferably no larger than 8 cm.

The information storage medium 110 according to the present invention is resistant to environmental degradation and is preferably able to withstand temperatures between −273° C. (0° K) and 1200° C. without suffering information loss. The information storage medium 100 may also resist electro-magnetic pulses, water damage, corrosion, acids and/or other chemicals. It is envisioned that the information storage medium 100 as herein described could preserve information 120 for a time period of at least 10 years, preferably at least 100 years, preferably at least 1,000 years, more preferably at least 10,000 years, more preferably at least 100,000 years. Under certain conditions of storage, including storage of the information storage medium 100 within an underground salt dome, the information storage medium may be able to preserve information for at least 1 million years.

Figure 4:
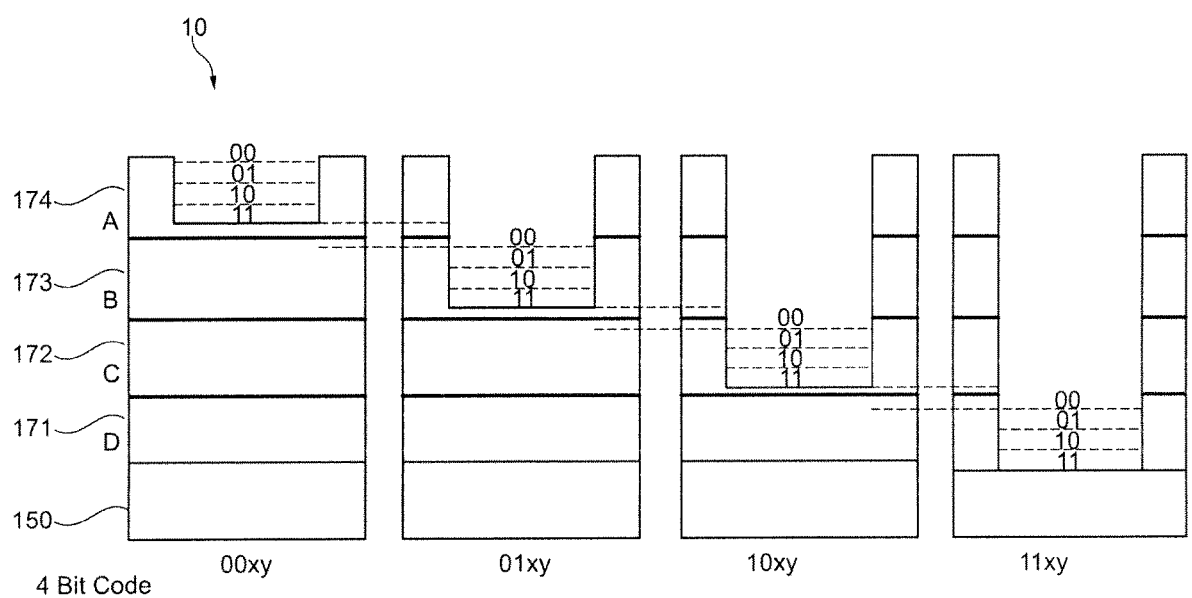
FIG. 4 schematically depicts a cross section through an information storage medium according to a preferred embodiment of the present invention.

FIG. 4 schematically depicts a cross section through an information storage medium suitable for long-term storage of information according to a further preferred embodiment of the present invention. The information storage medium comprises a ceramic substrate 150 coated with four layers 171 to 174 of different second materials being different from the material of the ceramic substrate 150. Again, a sintered interface (not shown) may be present at least between the ceramic substrate 150 and the bottommost layer 171 of the four layers. The sintered interface may comprise at least one element from both the substrate material and the material of the bottommost layer 171. Similar to the embodiment shown in FIG. 1, the information storage medium of the embodiment shown in FIG. 4 comprises a plurality of recesses 10 encoding information on the information storage medium, wherein the plurality of recesses 10 have different depths and wherein each depth corresponds to a predefined bit of information. Again, 16 different depths are shown in FIG. 4 corresponding to a 4-bit code.

However, different from the embodiment shown in FIG. 1, in case of the embodiment shown in FIG. 4 four different bits are encoded (by means of different depths) in each of the four layers 171 to 174. If the four layers 171 to 174 are made from different materials, the optical response of each layer may be different. This allows for achieving high accuracy during decoding because the depth information achieved may be correlated with, for example, the optical response.

Of course, more or less than four layers of different second materials may be present depending on the number of bits to be encoded.

Figure 5:
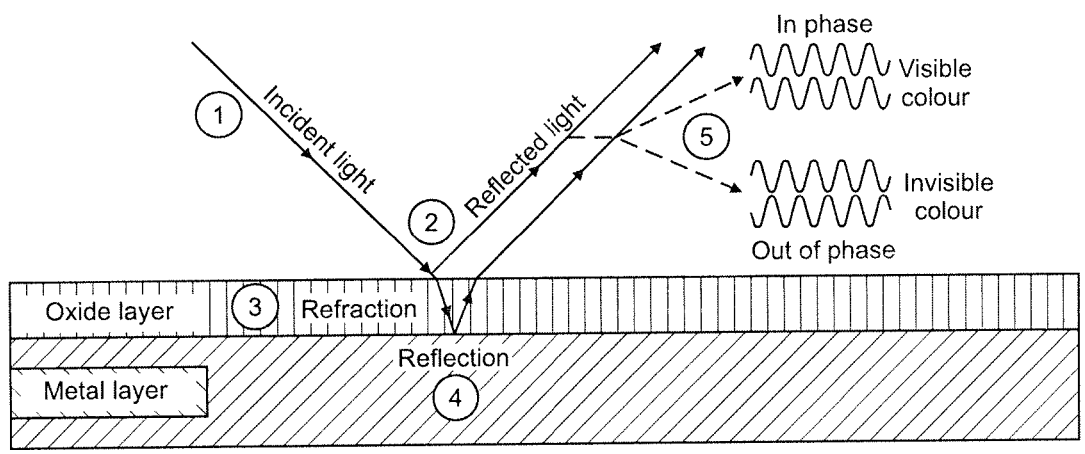
FIG. 5 schematically depicts the principle of interference in case of a metal/metal oxide layer system.

One particularly preferred example for the multi-layer coating shown in FIG. 4 is a two-layer coating with a metal layer 171 being coated on the substrate 150 and a metal oxide layer (of the same metal) 172 being coated on the metal layer 171. If such a two-layer coating is illuminated with incident white light as schematically shown in FIG. 5, a part of the incident light 1 is reflected (2) at the oxide layer, whereas another part of the incident light 1 is refracted (3) into the oxide layer and reflected (4) at the oxide/metal interface. The light beam having been reflected at the oxide layer and the light beam having been reflected at the metal layer can be in phase, which leads to a visible colour, or out of phase, which does not yield said colour to be visible. Accordingly, a certain colour (which depends on the indices of refraction of both the oxide layer and the metal layer and the thickness of the oxide layer) is visible wherever the oxide layer is present, yet is invisible if the depth of a certain recess leads to destructive interference at this particular spot.

Figure 6:
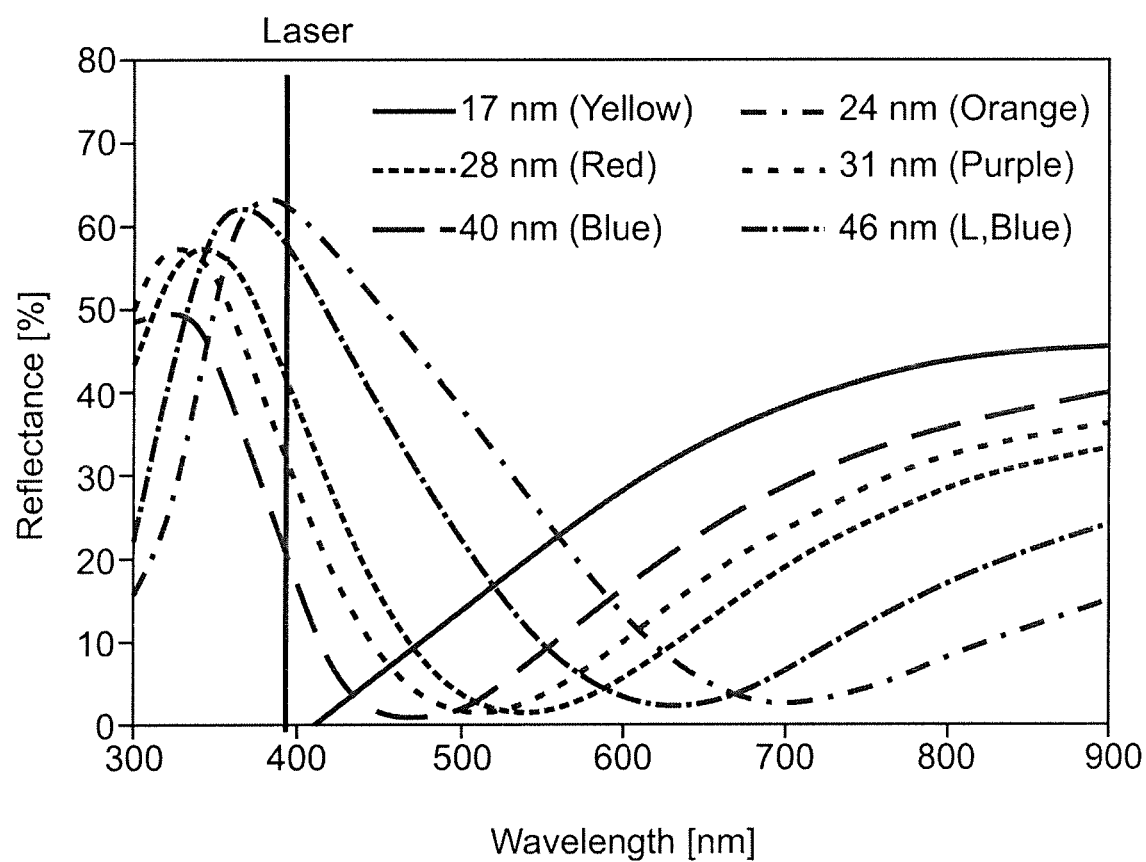
FIG. 6 depicts a graph of reflectance versus wavelength in case of a metal/metal oxide layer system.

FIG. 6 depicts an exemplary graph showing the reflectance of laser light depending on the wavelength for a Ti/TiO$_2$ double layer with different TiO$_2$ layer thicknesses (17 nm, 24 nm, 28 nm, 31 nm, 40 nm and 46 nm). As can be seen in FIG. 6, the minimum reflectance depends strongly on the layer thickness and is shifted from about 400 nm (thickness of 17 nm) to about 700 nm (thickness of 46 nm) changing the color impression from yellow to blue. Accordingly, a whole color spectrum may be encoded with multiple recesses of different depths corresponding to the respective reflectance minima.

Thus, it is in principle possible to create a polychrome microfilm utilizing a metal/metal oxide layer system and encoding different colours by means of different depths of recesses.

Figure 7:
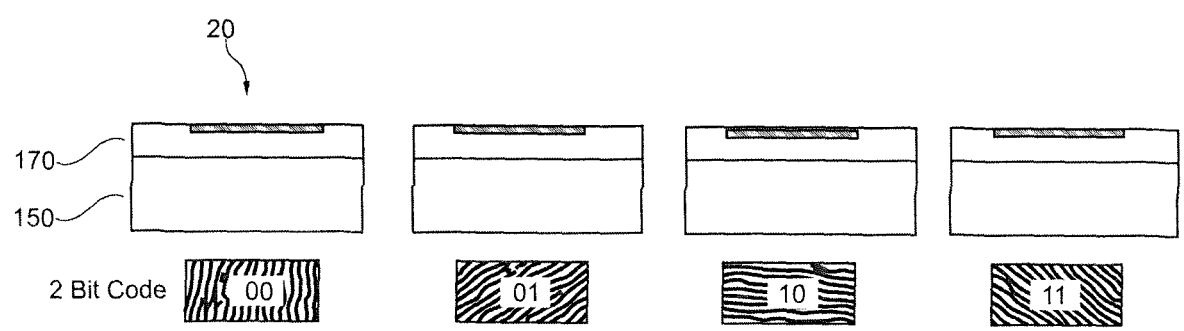
FIG. 7 schematically depicts a cross section through an information storage medium according to a preferred embodiment of the present invention.

FIG. 7 schematically depicts a cross-section through an information storage medium suitable for long-term storage of information according to a further preferred embodiment of the present invention. The information storage medium comprises a ceramic substrate 150 coated with a layer of the second material 170. Again, a sintered interface (not shown) may be present between the ceramic substrate 150 and the layer of the second material 170, wherein the sintered interface comprises at least one element from both the substrate material and the second material. The surface of the layer of the second material 170 comprises a plurality of nanostructures 20, wherein the plurality of nanostructures 20 have different optical properties and wherein each optical property corresponds to a predefined bit of information. In the specific example shown in FIG. 7, the different optical properties of the plurality of nanostructures 20 correspond to different orientations of so-called nano-ripples. In the depicted example, four different orientations of such nano-ripples are shown corresponding to a 2-bit code. Such nano-ripples having different orientations can be manufactured as follows: A femtosecond laser can be used to create wavy nanostructures named nano-ripples on ceramic (e.g. CrN) or metallic (Cr) surfaces. Several dozen to hundreds of linearly polarized femtosecond laser pulses and energy flow far below the ablation threshold generate the above mentioned nano ripples parallel to the direction of the polarization.

Several examples will be described in the following.

As a first example, a ceramic substrate made of Rubalit 708s containing at least 96% $Al_2O_3$ having the dimensions of 20 cm×20 cm available at CeramTec GmbH (Germany) was used as the raw material.

A plate of said ceramic substrate having the size of 10 cm×10 cm and a thickness of 1 mm was coated with a layer of CrN using physical vapor deposition. For this purpose, the ceramic plate was mounted on an electrically conductive plate made from steel with a size of 10 cm×10 cm. The ceramic plate together with the electrically conductive plate was brought into a physical vapor deposition machine available from Oerlikon Balzers AG (Lichtenstein).

Physical vapor deposition was then performed using the enhanced sputtering process BALI-NIT® CNI from Oerlikon Balzers AG at a process temperature below 250° C.

After the deposition, a layer of CrN with a constant thickness of 5 μm was present on one side of the ceramic substrate (opposite to the side facing the electrically conductive plate).

Subsequently, the coated ceramic substrate was tempered in a batch furnace model "N 150/H" available from Nabertherm GmbH. For tempering, the temperature was ramped up from room temperature (20° C.) to 1,000° C. within 2 h. The temperature was then increased with a rate of 100 K/h from 1,000° C. to 1,200° C. and the maximum temperature of 1,200° C. was maintained for 5 min. Subsequently, the substrate was cooled down with a rate of −200 K/h over 6 h.

After tempering, the stack of material comprised the ceramic substrate made of Rubalit 708s containing at least 96% $Al_2O_3$, a coating layer of CrN having a thickness of about 5 μm and a further metal oxide layer of $Cr_2O_3$ having a thickness of about 1 μm. Similar metal oxide layers have been described in Z. B. Qi et al. (Thin Solid Films 544 (2013), 515-520).

The metal oxide surface had a green darkish, almost black appearance.

The surface of said stack of material was inscribed in thin lines of 10-20 μm width of different depths using the femtosecond laser "CARBIDE" available from the company Light Conversion. The laser parameters used for inscribing were 230 fs pulse width, 515 nm wavelength, 60 kHz and 100 kHz repetition rate.

Figures 8A, 8B:
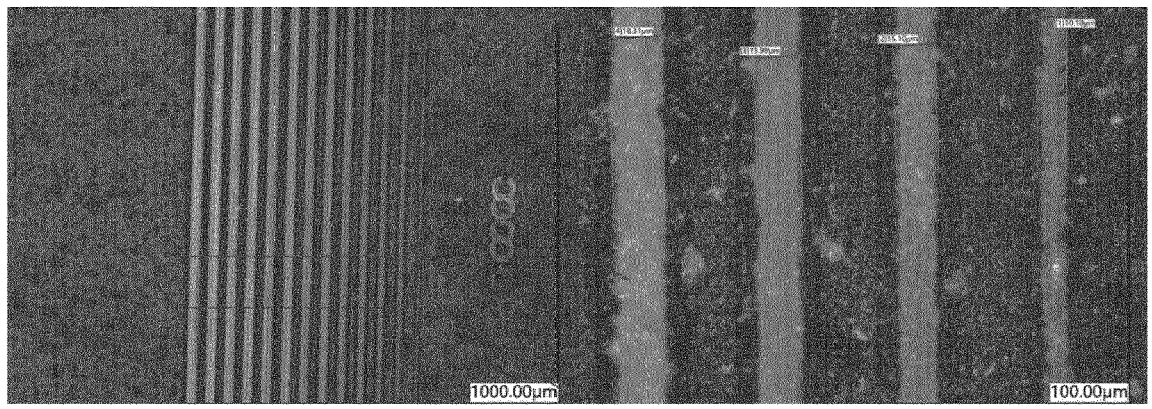
FIGS. 8a and 8b depict micrographs at two different magnifications showing an exemplary encoding.

The laser created recessions reaching several depth levels between 4 and 10 μm dependent on the number of pulses used. FIGS. 8a and 8b show micrographs of the surface of said probe taken with the Keyence VHX-7000 high-resolution 4K microscopes at different magnifications (the bar at the right bottom of the two micrographs corresponding to 1,000.00 μm and 100.00 μm, respectively) with the depth (and width) decreasing from left to right.

Figure 8C:
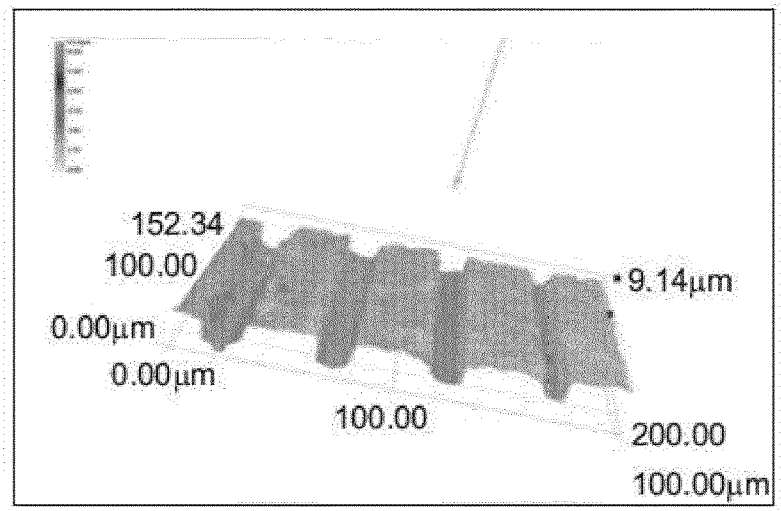
FIG. 8c shows a 3D visualization of a section of the micrograph of FIG. 8b.
Figure 8D:
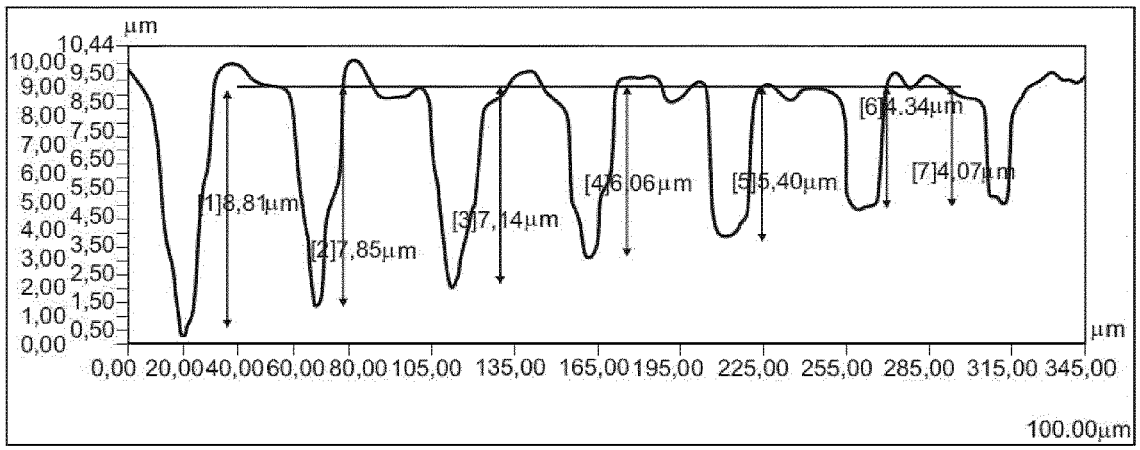

FIG. 8c shows a 3D visualization of a section through the micrograph of FIG. 8b. As may be taken from said figure, each recession has a substantially constant width and depth along its length. FIG. 8d shows the cross sectional height profile through a section of the micrograph of FIG. 8a. Again, the depth clearly decreases from left to right. As is clearly visible, the depth of each recession can be controlled by the number of pulses used for inscribing with each pulse creating a depth of 500-1,000 nm.

Interestingly, the edges of the inscription show no sign of molten coating material (CrN and $Cr_2O_3$) due to the cold ablation effect (Coulomb explosion) of ultra-short pulses.

As a second example, the same stack of material as described in the first example was produced.

Figure 9A:
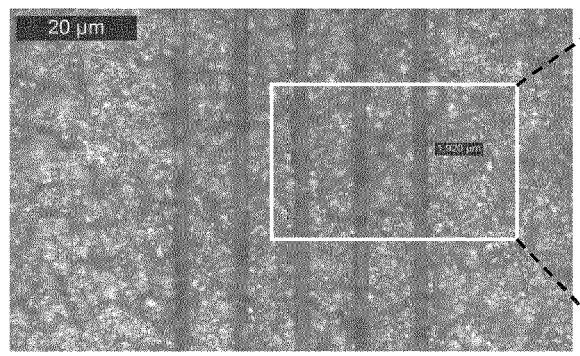
FIGS. 9a and 9b depict micrographs at two different magnifications showing an exemplary encoding.
Figure 9B:
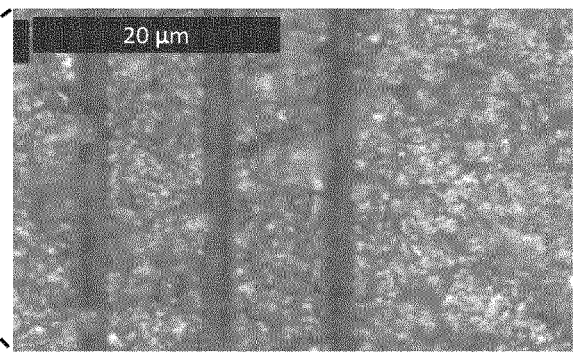

The surface of said stack of material was inscribed in thin lines of 1.92 μm width of different depths using a Spectra Physics Femtosecond-Laser Spirit-1040 HE30 (1040 nm, <400 fs, up to 120 μJ) using a focal length of 56 mm. Each laser pulse engraved a line recess having a depth of 1 μm. Each subsequent pulse at the same spot increased the depth by about 1 μm. Thus, five different line recesses of 1.92 μm width with depths of 1 μm, 2 μm, 3 μm, 4 μm, and 5 μm could be achieved. FIGS. 9a and 9b show micrographs of the surface of said probe taken with the Keyence VHX-7000 high-resolution 4K microscopes at different magnifications (the bar at the left top of the two micrographs corresponding to 20 μm) with the depth increasing from left to right.

As a third example, a ceramic substrate made of Rubalit 708s containing at least 96% $Al_2O_3$ having the dimensions of 22 mm×7 mm available at CeramTec GmbH has been coated with 500 nm CrN in a Leybold Z400 deposition system with the following process parameters:
- 3-inch Cr target (Plansee Composite Materials GmbH)
- base pressure below $5 \times 10^{-6}$ mbar
- working gas pressure: 0.36 Pa with a $N_2$/Ar flow-rate-ratio of 16/16 sccm/sccm
- DC target power: about 200 W (current controlled with 0.5 A)
- no substrate heating
- no substrate bias (hence, floating potential).

Figure 10:
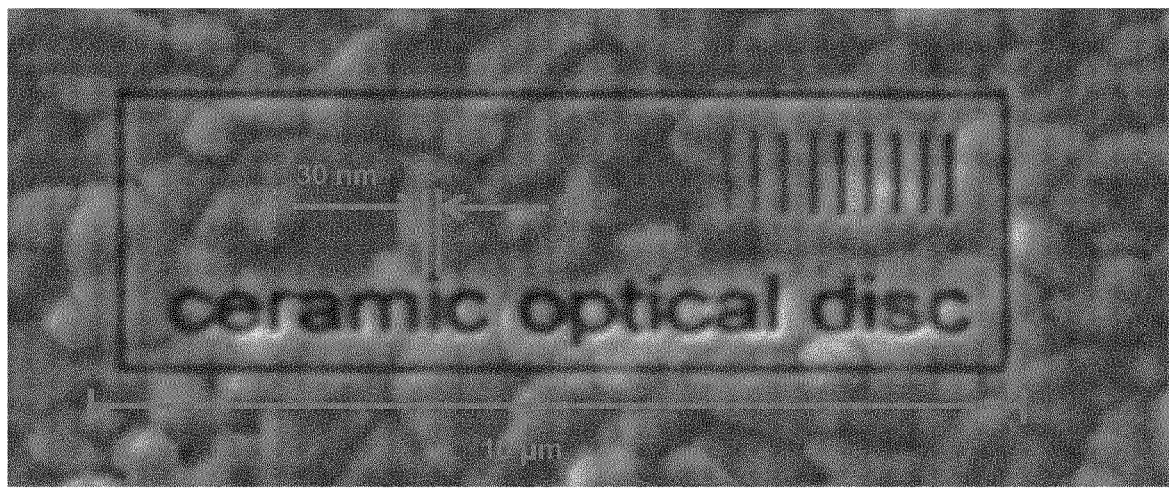
FIG. 10 depicts an SEM image taken from an exemplary encoding.

The surface of said probe was inscribed in thin lines of 30 nm width of different depths using a FEI Quanta 200 3D DFIB (a focused ion beam—FIB—workstation, equipped with a Ga ion source) with 6.667 nC/µm$^3$ at 0.1 nA and 30 kV (which corresponds to 2*1014 J/m$^3$ or 0.2 mJ/µm$^3$). The ion beam was focused to 11.5 nm spot size. The focused ion beam engraved in an initial passage a depth of 50 nm. Each subsequent inscription with a further ion beam passage increased the depth by about 50 nm. Thus, ten different line recesses of 30 nm width with depths of 50 nm, 100 nm, 150 nm, 200 nm, 250 nm, etc. could be achieved. FIG. 10 shows an SEM image of the surface of said probe taken with a FEI Quanta 250 FEG (a field emission gun scanning electron microscope—FEGSEM) with the depth increasing from left to right. The spacing identified in the SEM image with two arrows corresponds to 30.0 nm.

While the invention has been illustrated and described in detail in the drawings and foregoing description, such illustration and description are to be considered illustrative or exemplary and non-restrictive; the invention is thus not limited to the disclosed embodiments. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality and may mean "at least one".

The invention claimed is:

1. A method for storage of information, comprising:
   providing a ceramic substrate of a first material;
   coating the ceramic substrate with at least one layer each of a second material different from the first material; and
   creating a plurality of recesses in the at least one layer by using a laser in order to encode information in the at least one layer,
   wherein the plurality of recesses have different depths, and
   wherein each depth corresponds to a predefined bit of information.

2. The method of claim 1, wherein the ceramic substrate is coated with two or more layers, wherein the second materials of the two or more layers are different.

3. The method of claim 1, wherein the coated ceramic substrate is tempered before and/or after creating the plurality of recesses.

4. The method of claim 1, wherein the first material comprises at least 90% by weight of one or a combination of $Al_2O_3$, $TiO_2$, $SiO_2$, $ZrO_2$, $ThO_2$, MgO, $Cr_2O_3$, $Zr_2O_3$, or $V_2O_3$.

5. The method of claim 1, wherein the first material comprises at least 90% by weight of one or a combination of a metal nitride; a metal carbide; a metal boride; or a metal silicide.

6. The method of claim 1, wherein each second material comprises one or a combination of Cr, Co, Ni, Fe, Al, Ti, Si, W, Zr, Ta, Th, Nb, Mn, Mg, Hf, Mo, or V.

7. The method of claim 1, wherein each second material comprises one or a combination of a metal nitride; a metal carbide; a metal oxide; a metal boride; or a metal silicide.

8. The method of claim 1, wherein the laser comprises a femtosecond-laser, and wherein the plurality of recesses are created as Coulomb explosions.

9. The method of claim 1, wherein each at least one layer has a thickness no greater than 1 µm.

10. An information storage medium, comprising:
    a ceramic substrate of a first material coated with at least one layer each comprising a second material different from the first material; and
    a sintered interface between the ceramic substrate and a bottommost of the at least one layers,
    wherein the sintered interface comprises at least one element from both the first material and the second material of the bottommost layer,
    wherein the at least one layer comprises a plurality of recesses encoding information,
    wherein the plurality of recesses have different depths, and
    wherein each depth corresponds to a predefined bit of information.

11. The information storage medium of claim 10, wherein there are two or more layers, and wherein the second materials of the two or more layers are different.

12. The information storage medium of claim 11, wherein the two or more layers each have a thickness smaller than 100 nm.

13. The information storage medium of claim 10, wherein a minimum depth difference between the different depths of the plurality of recesses is at least 10 nm.

14. The information storage medium of claim 10, wherein a minimum depth difference between the different depths of the plurality of recesses is at most 500 nm.

15. The information storage medium of claim 10, wherein the first material comprises at least 90% by weight of one or a combination of $Al_2O_3$, $TiO_2$, $SiO_2$, $ZrO_2$, $ThO_2$, MgO, $Cr_2O_3$, $Zr_2O_3$, or $V_2O_3$.

16. The information storage medium of claim 10, wherein the first material comprises at least 90% by weight of one or a combination of a metal nitride; a metal carbide; a metal boride or a metal silicide.

17. The information storage medium of claim 10, wherein each second material comprises one or a combination of Cr, Co, Ni, Fe, Al, Ti, Si, W, Zr, Ta, Th, Nb, Mn, Mg, Hf, Mo, or V.

18. The information storage medium of claim 10, wherein each second material comprises one or a combination of a metal nitride; a metal carbide; a metal oxide; a metal boride; or a metal silicide.

19. The information storage medium of claim 10, further comprising an oxide layer on top of a topmost of the at least one layers.

20. The information storage medium of claim 10, wherein each at least one layer has a thickness no greater than 1 µm.

* * * * *